US 8,885,890 B2

(12) United States Patent
Tardif

(10) Patent No.: US 8,885,890 B2
(45) Date of Patent: Nov. 11, 2014

(54) DEPTH MAP CONFIDENCE FILTERING

(75) Inventor: John Tardif, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1051 days.

(21) Appl. No.: 12/776,066

(22) Filed: May 7, 2010

(65) Prior Publication Data

US 2011/0274366 A1    Nov. 10, 2011

(51) Int. Cl.
*G06K 9/00* (2006.01)
*G06K 9/40* (2006.01)
*G06T 5/00* (2006.01)

(52) U.S. Cl.
CPC ....... *G06T 5/002* (2013.01); *G06T 2207/10028* (2013.01); *G06T 2207/30168* (2013.01); *G06T 2207/20012* (2013.01)
USPC .......................................... 382/106; 382/261

(58) Field of Classification Search
None
See application file for complete search history.

(56) References Cited

U.S. PATENT DOCUMENTS

| | | |
|---|---|---|
| 4,627,620 A | 12/1986 | Yang |
| 4,630,910 A | 12/1986 | Ross et al. |
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |

(Continued)

FOREIGN PATENT DOCUMENTS

| | | |
|---|---|---|
| CN | 101254344 B | 6/2010 |
| EP | 0583061 A2 | 2/1994 |

(Continued)

OTHER PUBLICATIONS

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

(Continued)

*Primary Examiner* — Thomas Conway
(74) *Attorney, Agent, or Firm* — Gregg Wisdom; Judy Yee; Micky Minhas

(57) ABSTRACT

An apparatus and method for filtering depth information received from a capture device. Depth information is filtered by using confidence information provided with the depth information based an adaptively created, optimal spatial filter on a per pixel basis. Input data including depth information is received on a scene. The depth information comprises a plurality of pixels, each pixel including a depth value and a confidence value. A confidence weight normalized filter for each pixel in the depth information is generated. The weight normalized filter is combined with the input data to provide filtered data to an application.

18 Claims, 14 Drawing Sheets

(56) References Cited

U.S. PATENT DOCUMENTS

| | | | |
|---|---|---|---|
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson et al. |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,259,747 B2 | 8/2007 | Bell |
| 7,308,112 B2 | 12/2007 | Fujimura et al. |
| 7,317,836 B2 | 1/2008 | Fujimura et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,426,312 B2 * | 9/2008 | Dance et al. ............... 382/254 |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |
| 7,668,340 B2 | 2/2010 | Cohen et al. |
| 7,680,298 B2 | 3/2010 | Roberts et al. |
| 7,683,954 B2 | 3/2010 | Ichikawa et al. |
| 7,684,592 B2 | 3/2010 | Paul et al. |
| 7,701,439 B2 | 4/2010 | Hillis et al. |
| 7,702,130 B2 | 4/2010 | Im et al. |
| 7,704,135 B2 | 4/2010 | Harrison, Jr. |
| 7,710,391 B2 | 5/2010 | Bell et al. |
| 7,729,530 B2 | 6/2010 | Antonov et al. |
| 7,746,345 B2 | 6/2010 | Hunter |
| 7,760,182 B2 | 7/2010 | Ahmad et al. |
| 7,809,167 B2 | 10/2010 | Bell |
| 7,834,846 B1 | 11/2010 | Bell |
| 7,852,262 B2 | 12/2010 | Namineni et al. |
| RE42,256 E | 3/2011 | Edwards |
| 7,898,522 B2 | 3/2011 | Hildreth et al. |
| 8,035,612 B2 | 10/2011 | Bell et al. |
| 8,035,614 B2 | 10/2011 | Bell et al. |
| 8,035,624 B2 | 10/2011 | Bell et al. |

(56) References Cited

U.S. PATENT DOCUMENTS

| | | | |
|---|---|---|---|
| 8,072,470 B2 | 12/2011 | Marks | |
| 8,139,142 B2* | 3/2012 | Bamji et al. | 348/348 |
| 8,189,943 B2* | 5/2012 | Yea et al. | 382/257 |
| 8,260,076 B1* | 9/2012 | Yang et al. | 382/261 |
| 8,391,627 B1* | 3/2013 | Worthington | 382/260 |
| 2005/0013502 A1* | 1/2005 | Lim | 382/254 |
| 2006/0197937 A1 | 9/2006 | Bamji et al. | |
| 2006/0221250 A1 | 10/2006 | Rossbach et al. | |
| 2007/0018977 A1 | 1/2007 | Niem et al. | |
| 2008/0021912 A1 | 1/2008 | Seligman et al. | |
| 2008/0026838 A1 | 1/2008 | Dunstan et al. | |
| 2008/0027591 A1 | 1/2008 | Lenser et al. | |
| 2008/0170800 A1* | 7/2008 | Bergman et al. | 382/275 |

FOREIGN PATENT DOCUMENTS

| | | |
|---|---|---|
| EP | 2128693 A1 | 12/2009 |
| JP | 08044490 A1 | 2/1996 |
| WO | 93/10708 A1 | 6/1993 |
| WO | 97/17598 A1 | 5/1997 |
| WO | 99/44698 A1 | 9/1999 |

OTHER PUBLICATIONS

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Nonrigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collision of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

English Machine-translation of Japanese Publication No. JP08-044490 published on Feb. 16, 1996.

Chan, "A Noise-Aware Filter for Real-Time Depth Upsampling", Author manuscript, published in Workshop on Multi-camera and Multi-modal Sensor Fusion Algorithms and Applications—M2SFA2, Oct. 2008, 12 pages, Marseille, France.

Gokturk, "A Time-Of-Flight Depth Sensor—System Description, Issues and Solutions", Proceedings of the 2004 Conference on Computer Vision and Pattern Recognition Workshop (CVPRW'04) vol. 3, Jun. 2004, p. 35, IEEE Computer Society Washington, DC, USA.

Meers, "Head-Pose Tracking with a Time-of-Flight Camera", Originally Published in Proceedings of the Australasian Conference on Robotics & Automation, Dec. 2008.

Schuon, "High-Quality Scanning Using Time-Of-Flight Depth Superresolution", Computer Vision and Pattern Recognition Workshops, 2008. CVPRW '08. IEEE Computer Society Conference, Jun. 2008, pp. 1-7, Anchorage, AK, USA.

Amendment dated Apr. 9, 2013, in Chinese Appl. No. 201110127704.01 filed May 6, 2011.

Toyama, Kentaro, et al., "Probabilistic Tracking in a Metric Space," Eighth International Conference on Computer Vision, Vancouver, Canada, vol. 2, Jul. 2001, 8 pages.

\* cited by examiner

FIG. 10
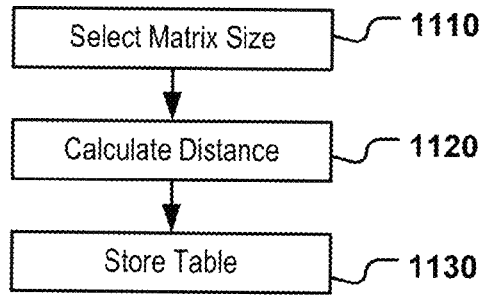
Select Matrix Size — 1110
Calculate Distance — 1120
Store Table — 1130
FIG. 11
| Distance | -2 | -1 | 0 | 1 | 2 |
|---|---|---|---|---|---|
| -2 | 2.828427125 | 2.236067977 | 2 | 2.236067977 | 2.828427125 |
| -1 | 2.236067977 | 1.414213562 | 1 | 1.414213562 | 2.236067977 |
| 0 | 2 | 1 | 0 | 1 | 2 |
| -1 | 2.236067977 | 1.414213562 | 1 | 1.414213562 | 2.236067977 |
| -2 | 2.828427125 | 2.236067977 | 2 | 2.236067977 | 2.828427125 |
1150
FIG. 12A
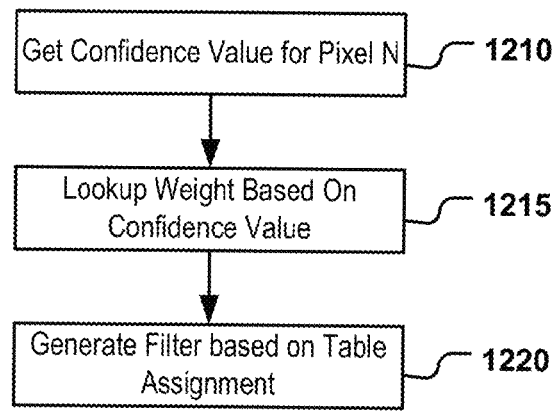
Get Confidence Value for Pixel N — 1210
Lookup Weight Based On Confidence Value — 1215
Generate Filter based on Table Assignment — 1220

Narrow Spatial Matrix

| .05 | .15 | .15 | .15 | .05 |
|---|---|---|---|---|
| .1 | .2 | .25 | .2 | .1 |
| .15 | .25 | .7 | .25 | .15 |
| .1 | .2 | .25 | .2 | .1 |
| .05 | .15 | .15 | .15 | .05 |

Wide Spatial Matrix

| .15 | .2 | .15 | .2 | .15 |
|---|---|---|---|---|
| .2 | .4 | .4 | .4 | .2 |
| .25 | .4 | .5 | .4 | .25 |
| .2 | .4 | .4 | .4 | .2 |
| .15 | .2 | .15 | .2 | .15 |

Combined Matrix

| .828427125 | .236067977 | .8243898 | .43874359 | .43874359 |
|---|---|---|---|---|
| 0.236067977 | .27239874 | .762748 | .414213562 | .236067977 |
| .9873209 | 1.0983 | 1.828427125 | .234267 | .43874359 |
| 0.236067977 | 0.987234 | .982734 | .414213562 | 2.236067977 |
| 0.828427125 | .09387345 | .231455 | .236067977 | 2.828427125 |

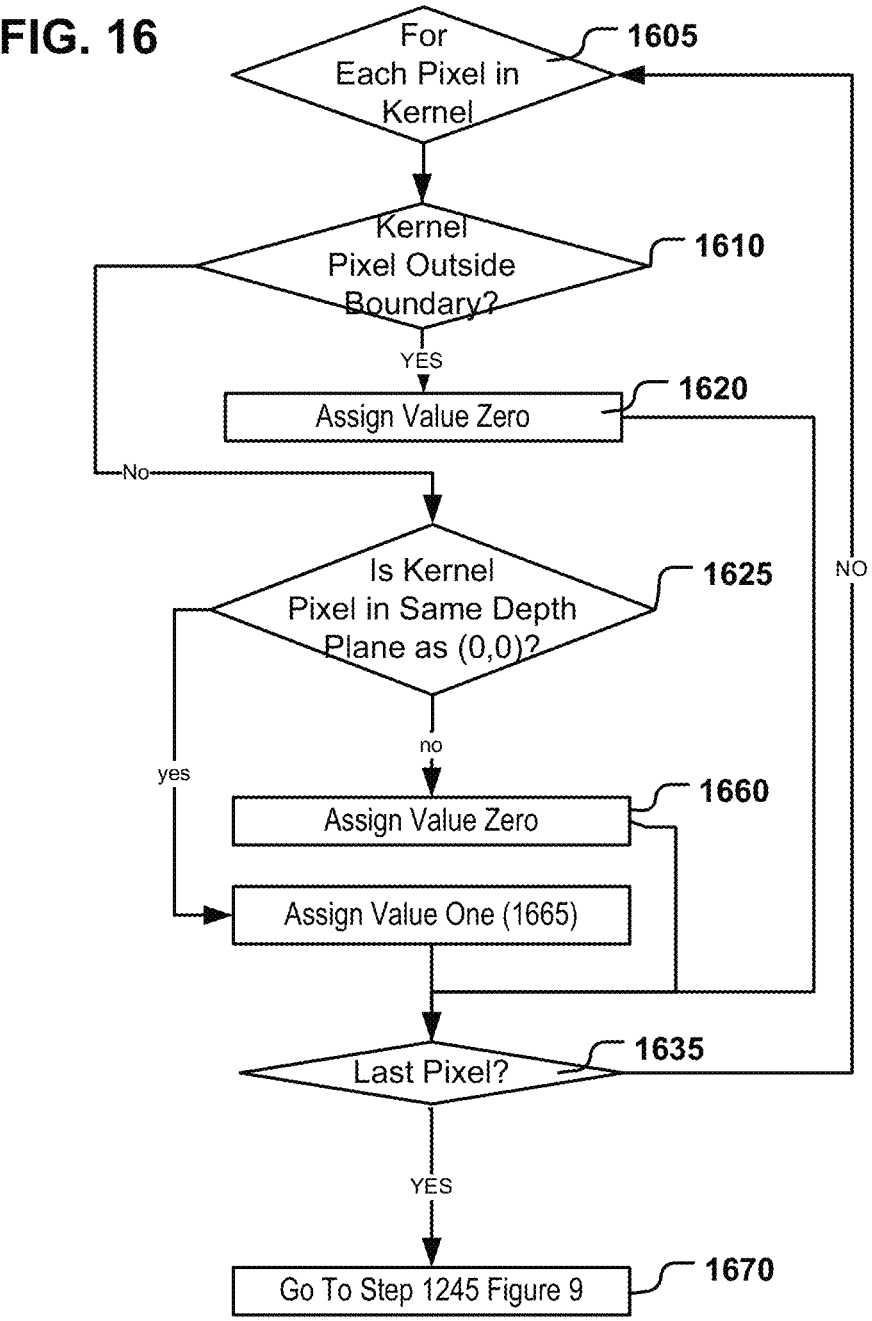

DEPTH MAP CONFIDENCE FILTERING

BACKGROUND

Various types of image based data acquisition devices use depth information for different applications. Time-of-flight range sensors with on-chip continuous-wave correlation of radio frequency-modulated signals are increasingly popular. They simultaneously deliver depth maps and intensity images with noise and systematic errors that are unique for this particular kind of data. Depth information of a scene is provided by a capture device along with a confidence indication quantifying the reliability that the depth information is accurate.

Various types of image processing techniques have been used to remove noise from two dimensional images. Noise can be generated from any of a number of errors in acquisition and can affect confidence information.

SUMMARY

Technology is disclosed for filtering depth information received from a capture device. Depth information is filtered by using confidence information provided with the depth information based an adaptively created, optimal spatial filter on a per pixel basis. In one embodiment, a method for filtering depth information including a confidence measure is provided. Input data including depth information is received on a scene. The depth information comprises a plurality of pixels, each pixel including a depth value and a confidence value. A confidence weight normalized filter for each pixel in the depth information is generated. The weight normalized filter is combined with the input data to provide filtered data to an application.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 10 illustrates a method for configuring a filter.

FIG. 11 illustrates a data store illustrating the distance values from an input pixel.

FIGS. 12A through 12D illustrate the creation of a spatial weighting matrix using the input pixel confidence value and the distance to a kernel pixel.

FIG. 16 illustrates a process for preparing an object correlation matrix.

DETAILED DESCRIPTION

Technology is disclosed for filtering depth information received from a capture device. Depth information is filtered by using confidence information provided with the depth information based on an adaptively created, optimal spatial filter on a per pixel basis. More weighting in the filter coefficients is used for input samples that are closer to the spatial position of the output. More weighting is applied for input depth samples that have higher confidence than for input depth samples with lower confidence. Scaling of the coefficients ensures that overall gain and localized gain is preserved.

The technology is advantageously utilized in a target recognition, analysis, and tracking system such as that disclosed in U.S. patent application Ser. No. 12/475,094 entitled "Environment And/Or Target Segmentation", filed May 29, 2009 and hereby fully incorporated herein by reference; U.S. patent application Ser. No. 12/603,437, "Pose Tracking Pipeline," filed on Oct. 21, 2009. (hereinafter referred to as the '437 application), and hereby fully incorporated herein by reference; U.S. patent application Ser. No. 12/475,308, "Device for Identifying and Tracking Multiple Humans Over Time," filed on May 29, 2009, and hereby fully incorporated herein by reference; "Motion Detection Using Depth Images," filed on Dec. 18, 2009, and hereby fully incorporated herein by reference; U.S. patent application Ser. No. 12/575,388, "Human Tracking System," filed on Oct. 7, 2009, and hereby fully incorporated herein by reference.

The capture device may be coupled to a computing environment such as that illustrated in FIGS. 1-4. The computing environment 12 may be a computer, a gaming system or console, or the like. According to an example embodiment, the computing environment 12 may include hardware components and/or software components such that the computing environment 12 may be used to execute applications such as gaming applications, non-gaming applications, or the like. In one embodiment, the computing environment 12 may include a processor such as a standardized processor, a specialized processor, a microprocessor, or the like that may execute instructions including, for example, instructions for receiving a depth image.

According to one embodiment, the target recognition, analysis, and tracking system 10 may be connected to an audiovisual device (not shown) such as a television, a monitor, a high-definition television (HDTV), or the like that may provide game or application visuals and/or audio to a user. For example, the computing environment 12 may include a video adapter such as a graphics card and/or an audio adapter such as a sound card that may provide audiovisual signals associated with the game application, non-game application, or the like.

Other applications for the instant technology exist and use in a target recognition, analysis and tracking system is merely one exemplary use.

Figure 1:
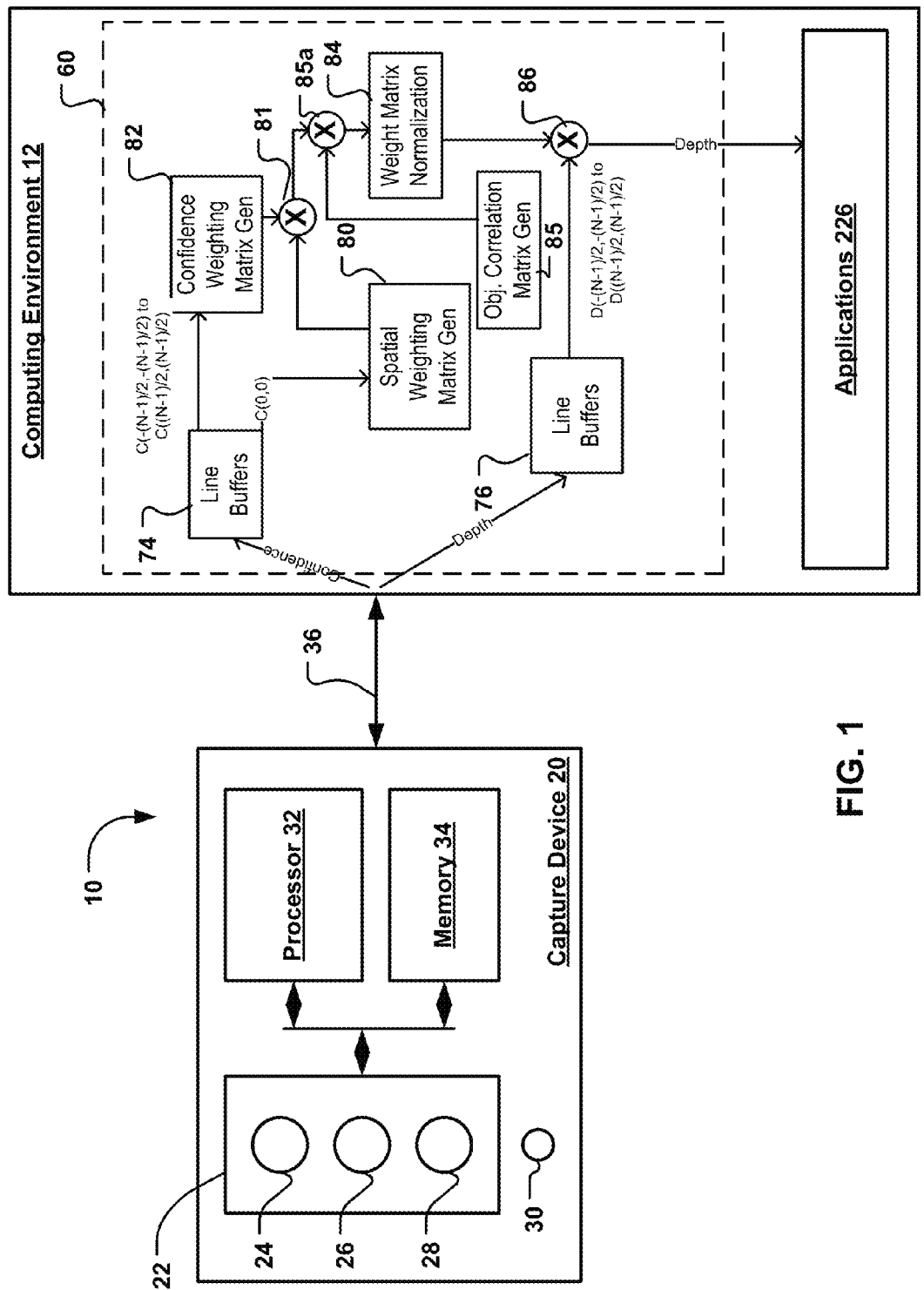
FIG. 1 depicts a capture device and a processing device suitable for implementing the present technology.

FIG. 1 illustrates an example embodiment of a capture device 20 that may be used in conjunction with a computing environment 12. According to an example embodiment, the capture device 20 may be configured to capture video with depth information including a depth image that may include depth values via any suitable technique including, for example, time-of-flight, structured light, stereo image, or the like. According to one embodiment, the capture device 20 may organize the depth information into "Z layers," or layers that may be perpendicular to a Z axis extending from the depth camera along its line of sight.

As shown in FIG. 1 the capture device 20 may include an image camera component 22. According to an example embodiment, the image camera component 22 may be a depth camera that may capture the depth image of a scene. The depth image may include a two-dimensional (2-D) pixel area of the captured scene where each pixel in the 2-D pixel area may represent a depth value such as a length or distance in, for example, centimeters, millimeters, or the like of an object in the captured scene from the camera.

As shown in FIG. 1, according to an example embodiment, the image camera component 22 may include an IR light component 24, a three-dimensional (3-D) camera 26, and an RGB camera 28 that may be used to capture the depth image of a scene. For example, in time-of-flight analysis, the IR light component 24 of the capture device 20 may emit an infrared light onto the scene and may then use sensors (not shown) to detect the backscattered light from the surface of one or more targets and objects in the scene using, for example, the 3-D camera 26 and/or the RGB camera 28. In some embodiments, pulsed infrared light may be used such that the time between an outgoing light pulse and a corresponding incoming light pulse may be measured and used to determine a physical distance from the capture device 20 to a particular location on the targets or objects in the scene. Additionally, in other example embodiments, the phase of the outgoing light wave may be compared to the phase of the incoming light wave to determine a phase shift. The phase shift may then be used to determine a physical distance from the capture device to a particular location on the targets or objects.

According to another example embodiment, time-of-flight analysis may be used to indirectly determine a physical distance from the capture device 20 to a particular location on the targets or objects by analyzing the intensity of the reflected beam of light over time via various techniques including, for example, shuttered light pulse imaging.

In another example embodiment, the capture device 20 may use a structured light to capture depth information. In such an analysis, patterned light (i.e., light displayed as a known pattern such as grid pattern or a stripe pattern) may be projected onto the scene via, for example, the IR light component 24. Upon striking the surface of one or more targets or objects in the scene, the pattern may become deformed in response. Such a deformation of the pattern may be captured by, for example, the 3-D camera 26 and/or the RGB camera 28 and may then be analyzed to determine a physical distance from the capture device to a particular location on the targets or objects.

According to another embodiment, the capture device 20 may include two or more physically separated cameras that may view a scene from different angles to obtain visual stereo data that may be resolved to generate depth information.

The capture device 20 may further include a microphone 30. The microphone 30 may include a transducer or sensor that may receive and convert sound into an electrical signal. According to one embodiment, the microphone 30 may be used to reduce feedback between the capture device 20 and the computing environment 12 in the target recognition, analysis, and tracking system 10. Additionally, the microphone 30 may be used to receive audio signals that may also be provided by the user to control applications such as game applications, non-game applications, or the like that may be executed by the computing environment 12.

In an example embodiment, the capture device 20 may further include a processor 32 that may be in operative communication with the image camera component 22. The processor 32 may include a standardized processor, a specialized processor, a microprocessor, or the like that may execute instructions including, for example, instructions for receiving a depth image; generating depth map based on the depth image; providing confidence information based on the depth image, or any other suitable instruction, which will be described in more detail below.

The capture device 20 may further include a memory component 34 that may store the instructions that may be executed by the processor 32, images or frames of images captured by the 3-D camera or RGB camera, or any other suitable information, images, or the like. According to an example embodiment, the memory component 34 may include random access memory (RAM), read only memory (ROM), cache, Flash memory, a hard disk, or any other suitable storage component. As shown in FIG. 1, in one embodiment, the memory component 34 may be a separate component in communication with the image capture component 22 and the processor 32. According to another embodiment, the memory component 34 may be integrated into the processor 32 and/or the image capture component 22.

As shown in FIG. 1, the capture device 20 may be in communication with the computing environment 12 via a communication link 36. The communication link 36 may be a wired connection including, for example, a USB connection, a Firewire connection, an Ethernet cable connection, or the like and/or a wireless connection such as a wireless 802.11b, g, a, or n connection. According to one embodiment, the computing environment 12 may provide a clock to the capture device 20 that may be used to determine when to capture, for example, a scene via the communication link 36.

Additionally, the capture device 20 may provide the depth information and images captured by, for example, the 3-D camera 26 and/or the RGB camera 28, to the computing environment 12 via the communication link 36.

Also shown in FIG. 1 is a filtering element 60 comprising line buffers 74, 76, confidence weighting matrix generator 82, spatial weighting matrix generator 80 an normalization engine 84. Also shown are multipliers 81 and 86. Filtering element 60 and components included thereon may be comprised of dedicated hardware components, be integrated on one or more of the peripheral components illustrated in FIGS. 2 and 3, or be implemented by code for instructing a processor such as CPU 101 or processing unit 259 in FIGS. 2 and 3 respectively to perform the tasks described below in FIGS. 9-16.

Enabling the line buffers 74, 76, confidence weighting matrix generator 82, spatial weighting matrix generator 80, normalization engine 84, an object correlation matrix generator 85 and correlation matrix multiplier 85*a*, and multipliers 81 and 86 are implemented as hardware components generators as hardware adders, multipliers and memory increases the speed of the generators and allows filtering with minimal added latency.

Depth information acquired from capture device 20 may be provided via link 36 to the computing environment. Filtering in accordance with the technology is performed on each input pixel of a scene of information. An image may be thought of as a set of pixels showing a version of the scene. Depth information may be provided from the capture device in a raster scan fashion or using a global shutter exposure. Raster scanning generally occurs on an image from left to right while progressing from top to bottom in an image sensor.

Buffers 74 and 76 allow for the capture of a sufficient amount of information (depending on the filter matrix configuration discussed below with respect to FIG. 10) to allow the filtering technology to act on the input stream. As information is provided to the filtering element 60, buffers 74, 76 acquire sufficient information for confidence weighting matrix generator 82, spatial weighting matrix generator 80, object correlation matrix generator 85, normalization engine 84 and multipliers 81, 85*a* and 86 to provide filtering operations.

In general, for each input pixel, a filter matrix is defined based on a filter resolution matrix based on a number of pixels adjacent to the input pixel. For every input pixel, the confidence weighting matrix generator 82 generates a confidence filter matrix based on the confidence values of the pixels in the matrix surrounding the input pixel. The spatial weighting matrix generator 80 builds a spatial weighting matrix based on the confidence value of the input pixel and the distance of a pixel in the matrix to a surrounding pixel. Multiplier 81 combines the values of the confidence weighting matrix generator 82 and the spatial weighting matrix generator 80 to provide a combined matrix. An object correlation matrix generator 85 generates a correlation weighting matrix to remove components of the filter matrix where kernel pixels are on different depth planes and are found by the technology. The object correlation matrix removes undefined pixels outside the image boundary and pixels from different objects during the filtering process. The output of multiplier 81 is combined with the object correlation matrix using multiplier 85*a*. The normalization engine 84 creates a normalized combined matrix which is then combined with the input values by multiplier 86 to provide a filtered depth output to one or more applications 226.

Figure 2:
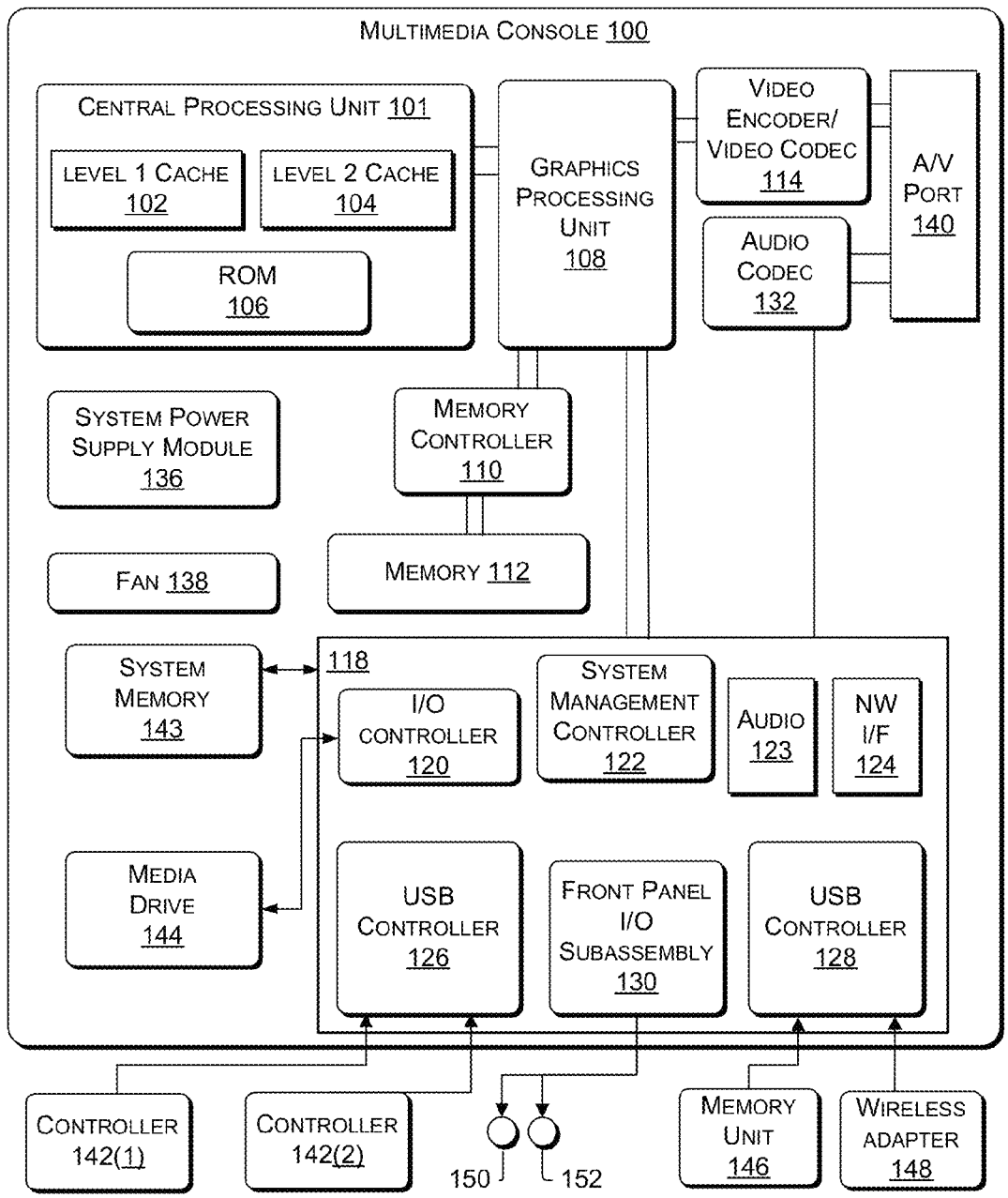
FIG. 2 depicts an exemplary multimedia console-processing device.

FIG. 2 illustrates an example embodiment of a computing environment that may be used to interpret one or more gestures in a target recognition, analysis, and tracking system and/or animate an avatar or on-screen character displayed by the target recognition, analysis, and tracking system. The computing environment such as the computing environment 12 described above with respect to FIG. 1 may be a multimedia console 100, such as a gaming console. As shown in FIG. 2, the multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The flash ROM 106 may store executable code that is loaded during an initial phase of a boot process when the multimedia console 100 is powered ON.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as, but not limited to, a RAM (Random Access Memory).

The multimedia console 100 includes an I/O controller 120, a system management controller 122, an audio processing unit 123, a network interface controller 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 100 is powered ON, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager preferably controls the switching of input stream, without knowledge the gaming application's knowledge and a driver maintains state information regarding focus switches. The cameras 26, 28 and capture device 20 may define additional input devices for the console 100.

Figure 3:
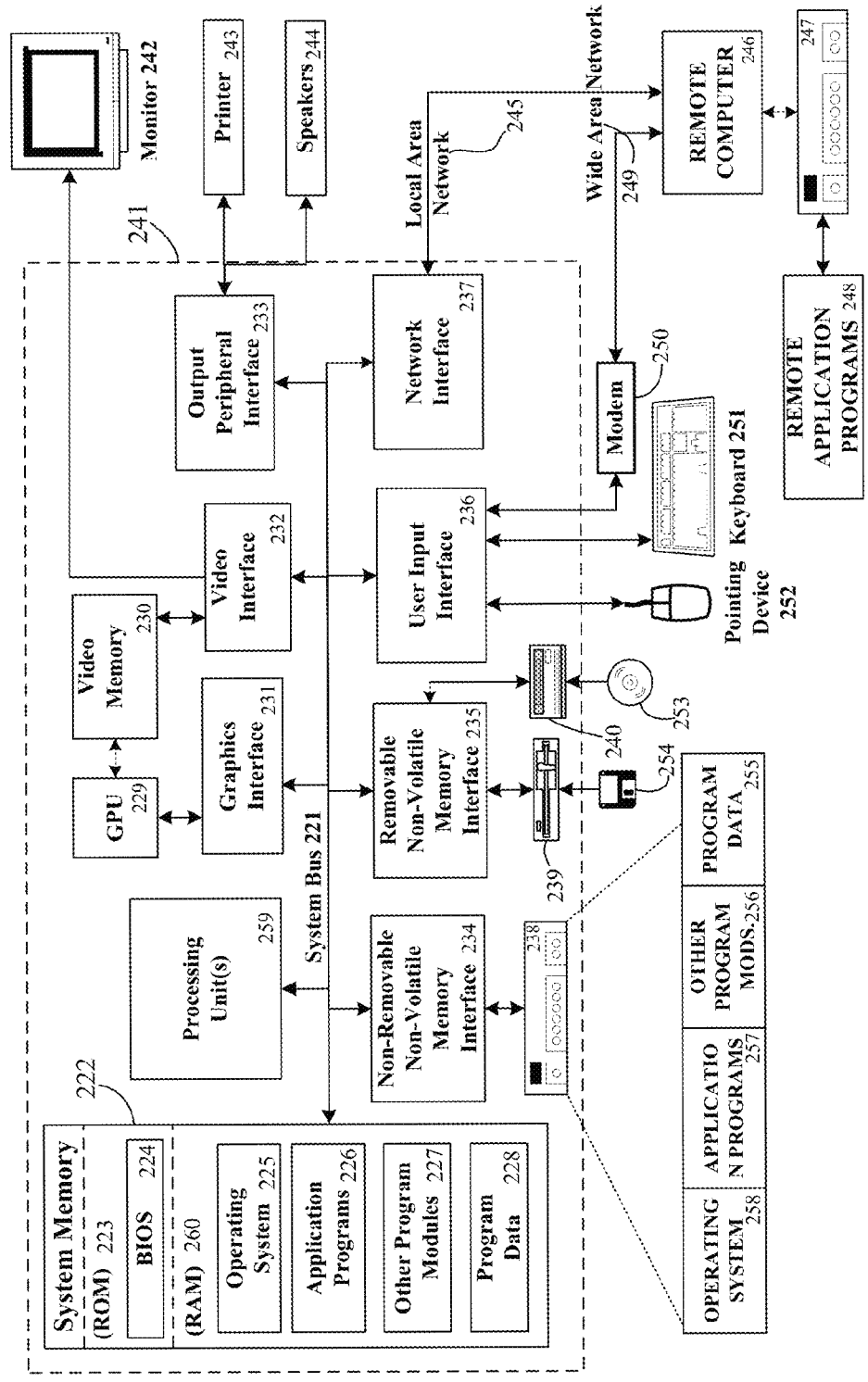
FIG. 3 depicts a second embodiment of a processing device.

FIG. 3 illustrates another example embodiment of a computing environment 220 that may be the computing environment 12 shown in FIG. 1. The computing system environment 220 is only one example of a suitable computing environment and is not intended to suggest any limitation as to the scope of use or functionality of the presently disclosed subject matter. Neither should the computing environment 220 be interpreted as having any dependency or requirement relating to any one or combination of components illustrated in the exemplary operating environment 220. In some embodiments the various depicted computing elements may include circuitry configured to instantiate specific aspects of the present disclosure. For example, the term circuitry used in the disclosure can include specialized hardware components configured to perform function(s) by firmware or switches. In other examples embodiments the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

In FIG. 3, the computing environment 220 comprises a computer 241, which typically includes a variety of computer readable media. Computer readable media can be any available media that can be accessed by computer 241 and includes both volatile and nonvolatile media, removable and non-removable media. The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 3 illustrates operating system 225, application programs 226, other program modules 227, and program data 228.

The computer 241 may also include other removable/non-removable, volatile/nonvolatile computer storage media. By way of example only, FIG. 3 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 3, provide storage of computer readable instructions, data structures, program modules and other data for the computer 241. In FIG. 3, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). The cameras 26, 28 and capture device 20 may define additional input devices for the console 100. A monitor 242 or other type of display device is also connected to the system bus 221 via an interface, such as a video interface 232. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 3. The logical connections depicted in FIG. 2 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 3 illustrates remote application programs 248 as residing on memory device 247. It will be appreciated that the network connections shown are exemplary and other means of establishing a communications link between the computers may be used.

Figure 4:
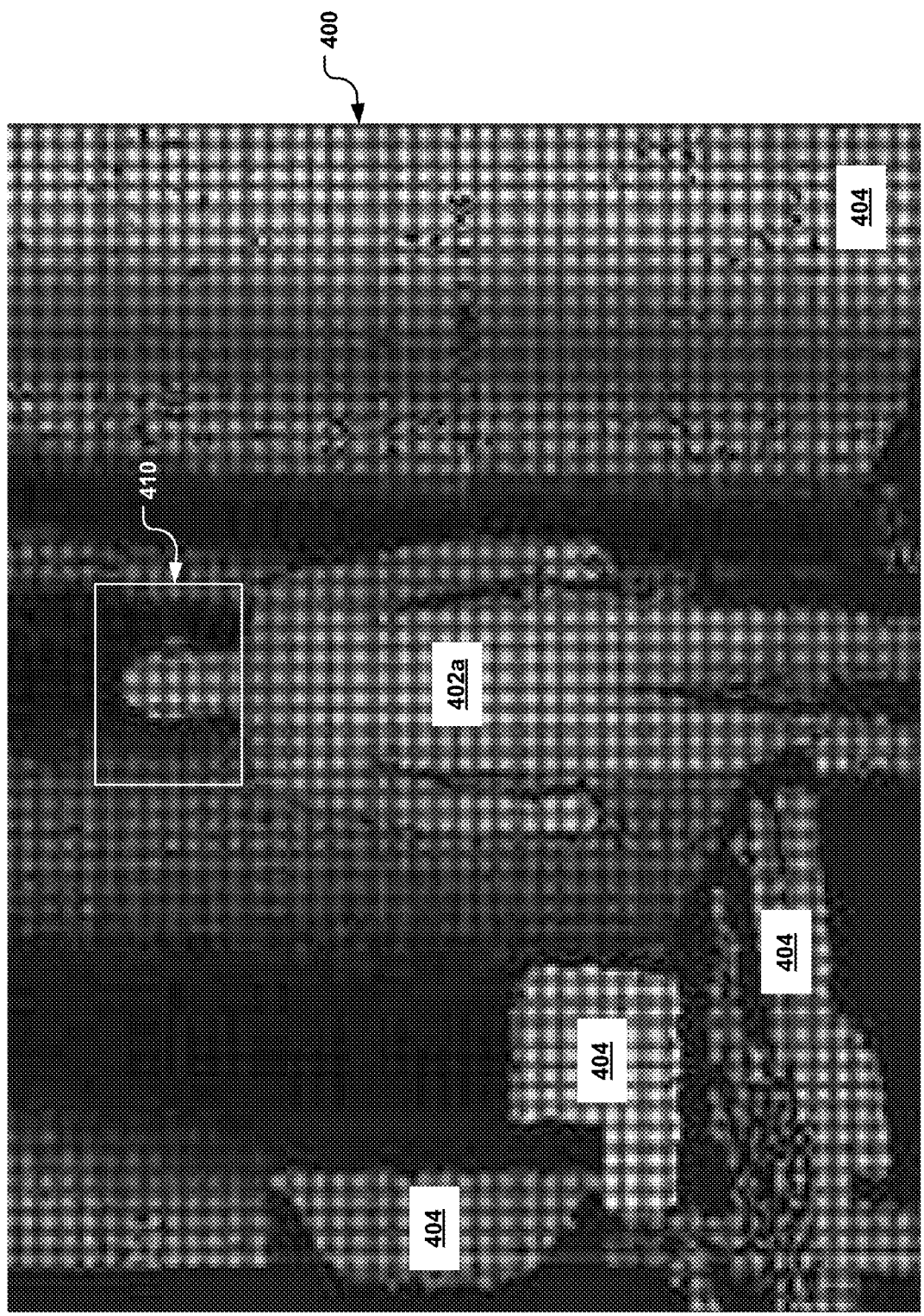
FIG. 4 is an exemplary depth image captured by a capture device.

FIG. 4 illustrates an example embodiment of a depth image 400 that may be received by the computing environment 12. According to an example embodiment, the depth image 400 may be an image or frame of a scene captured by, for example, the 3-D camera 26 and/or the RGB camera 28 of the capture device 20 described above with respect to FIG. 1. As shown in FIG. 4, the depth image 400 may include a human target 402a corresponding to, for example, a user and one or more non-human targets 404 such as a wall, a table, a monitor, or the like in the captured scene. The depth image 400 may include a plurality of observed pixels where each observed pixel has an observed depth value associated therewith. For example, the depth image 400 may include a two-dimensional (2-D) pixel area of the captured scene where each pixel at particular X-value and Y-value in the 2-D pixel area may have a depth value such as a length or absolute distance in, for example, centimeters, millimeters, or the like of a target or object in the captured scene from the capture device.

In one embodiment, the depth image 400 may be colorized such that different colors of the pixels of the depth image correspond to and/or visually depict different distances of the human target 402a and non-human targets 404 from the capture device. For example, the pixels associated with a target closest to the capture device may be colored with shades of red and/or orange in the depth image whereas the pixels associated with a target further away may be colored with shades of green and/or blue in the depth image.

For example, as described above, the depth image may include a 2-D pixel area of the captured scene where each pixel may have an X-value, a Y-value, and a depth value (or Z-value) associated therewith. In one embodiment, the depth image may be downsampled by reducing the pixels in the 2-D pixel area into a grid of one or more pixels. For example, the depth image may be divided into portions or blocks of pixels such as 4×4 blocks of pixels, 5×5 blocks of pixels, 8×8 block of pixels, a 10×10 block of pixels, or the like.

Figure 5:
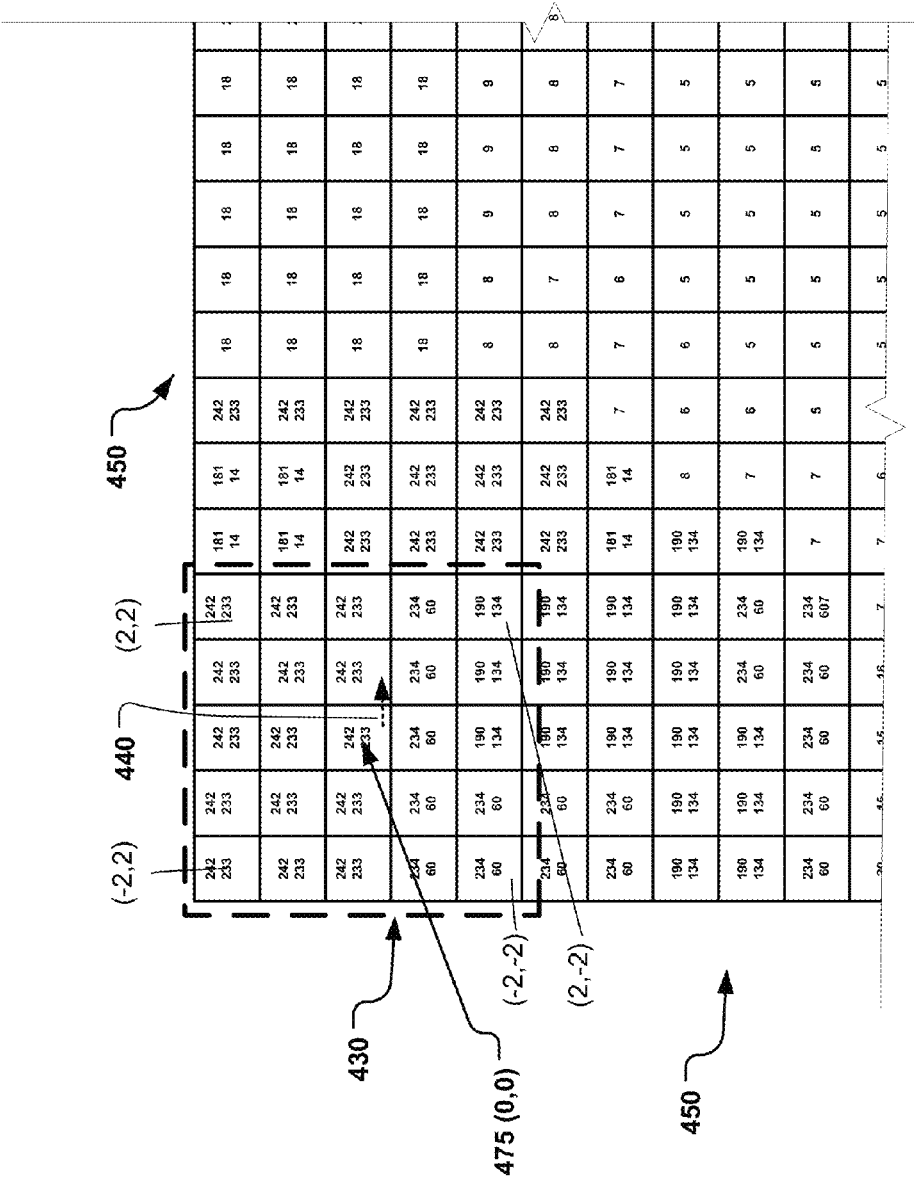
FIG. 5 illustrates an example embodiment of a portion of the depth image being sampled

FIG. 5 illustrates an example embodiment of a portion of the depth image being sampled. For example, as shown in FIG. 5, a portion 430 of the depth image 400 described above with respect to FIG. 4 may include a plurality of pixels 450 where each pixel may have an X-value, a Y-value, and a depth value (or Z-value) associated therewith. According to one embodiment, as described above, a depth image such as the depth image 400 may be divided into a portion or a block 430 of the pixels such as 5×5 block of the pixels. An application such as a target recognition, analysis, and tracking system may process the image, using pixels therein to represent a position associated with the pixels in real-world space.

Each of the plurality of pixels may include a position relative to the image and relative to the 5×5 block. The relative position of pixels in an image may be referred to as pixel separation. In the present description, an input pixel 475 may be provided at the center of a block of pixels representing a spatial kernel, and pixels in the kernel may have a relative x and y coordinate positions within the kernel as shown in FIG. 5, at (−2,2) to (2,2) and (−2, −2) to (2, −2), with the coordinates being relative positions from the input pixel.

Prior to providing the depth information to an application from the capture device 20, the depth information z-values may be filtered as discussed below.

Figure 6:
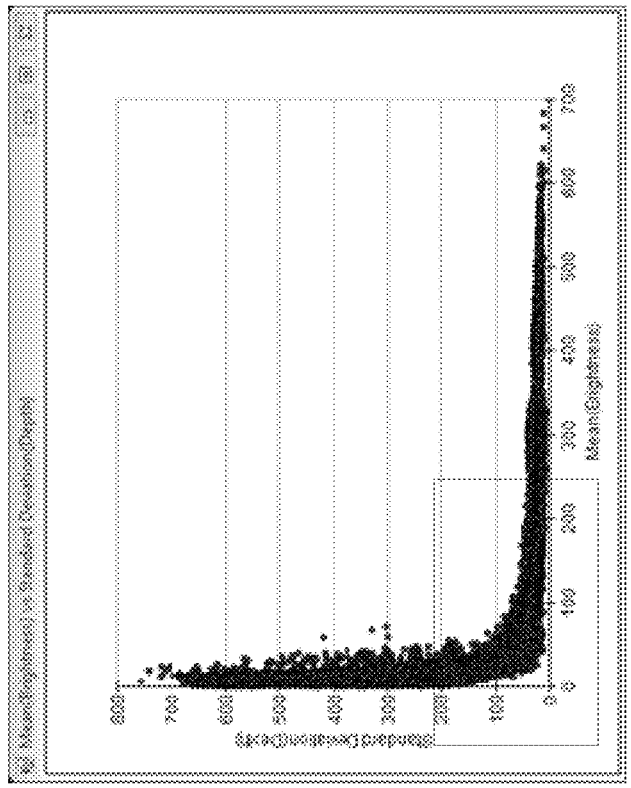
FIGS. 6 and 7 show a scatter plot of a typical scene's depth noise versus uncertainty.
Figure 7:
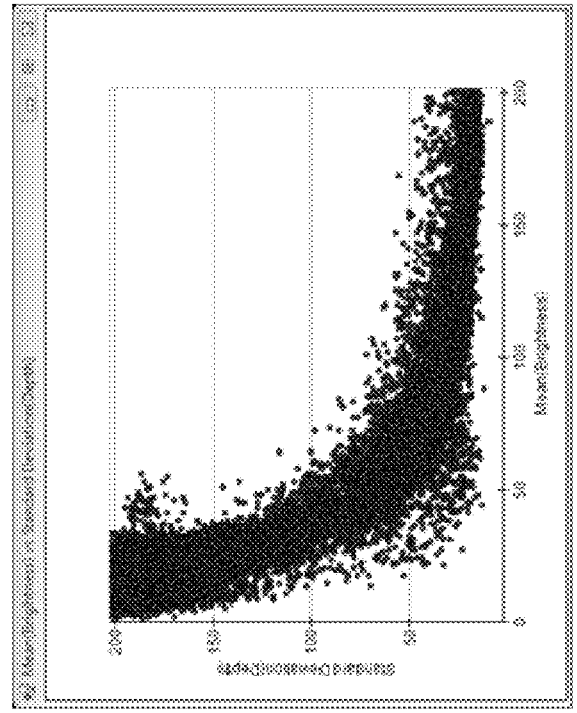

FIGS. 6 and 7 show a scatter plot of a typical scene's depth noise versus uncertainty. FIG. 7 is an enlarged area of portion 700 near the bend in the curve of the data in FIG. 6. Many depth acquisition technologies provide depth and confidence data. In cameras using time of flight (TOF) technology, a light source is project onto a scene, the light reflects off objects in the scene, and that reflected light is gathered by an image sensor. Though TOF principles vary, there is a general correlation between the strength of the reflected light gathered and the noise in the resultant generated depth sample. More light gathered equates with less noise for the depth sample, as illustrated in FIGS. 6 and 7. It should be noted that while the confidence correlates with the noise of the depth samples, it is usually not a linear relationship.

Figure 8:
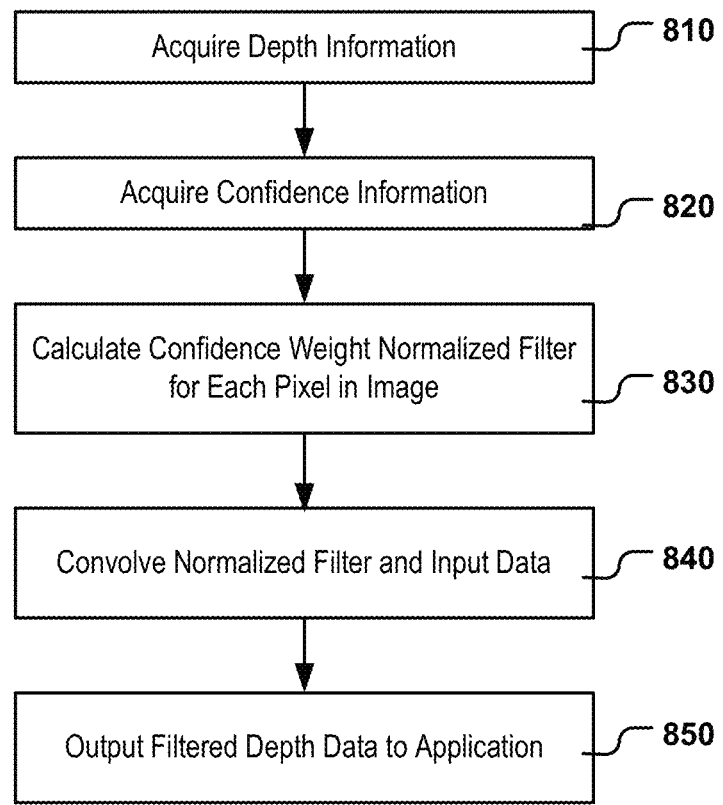
FIG. 8 illustrates a method in accordance with the present technology for dynamically filtering a depth image.

FIG. 8 illustrates a method in accordance with the present technology for dynamically filtering a depth image. The method illustrated in FIG. 8 may be performed by a computing environment 12 and, in one embodiment, the components illustrated in FIG. 1. Alternatively, a single processor in a computing environment may perform the method illustrated in FIG. 8 following instructions provided to program the processor to perform the method.

In 810, depth information from a capture device, such as capture device 20, is acquired by the computing environment 12. At 820, included with the depth information is confidence information. Confidence information is a measure of the reliability that the depth information is accurate. As noted above, the depth and confidence information may be provided by the capture device via link 36 and directed to buffers 74 and 76, respectively. Depth information may comprise a z-axis distance value for a particular pixel in a captured scene, while confidence information may be a numerical indication of the reliability of the depth information provided on a known scale. In one embodiment, for example, the confidence information may comprise an 8 bit numerical value (e.g. 0-255). In 830, a confidence weight normalized filter is calculated for each pixel in an image acquired at 810 and 820. A method for performing step 830 is illustrated below with respect to FIGS. 10 through 16. In 840, the confidence weight normalized filter information and input data acquired at 810 are convolved to provide a filtered value for each pixel in the image. The filtered input data is then provided to an application at 850.

Figure 9:
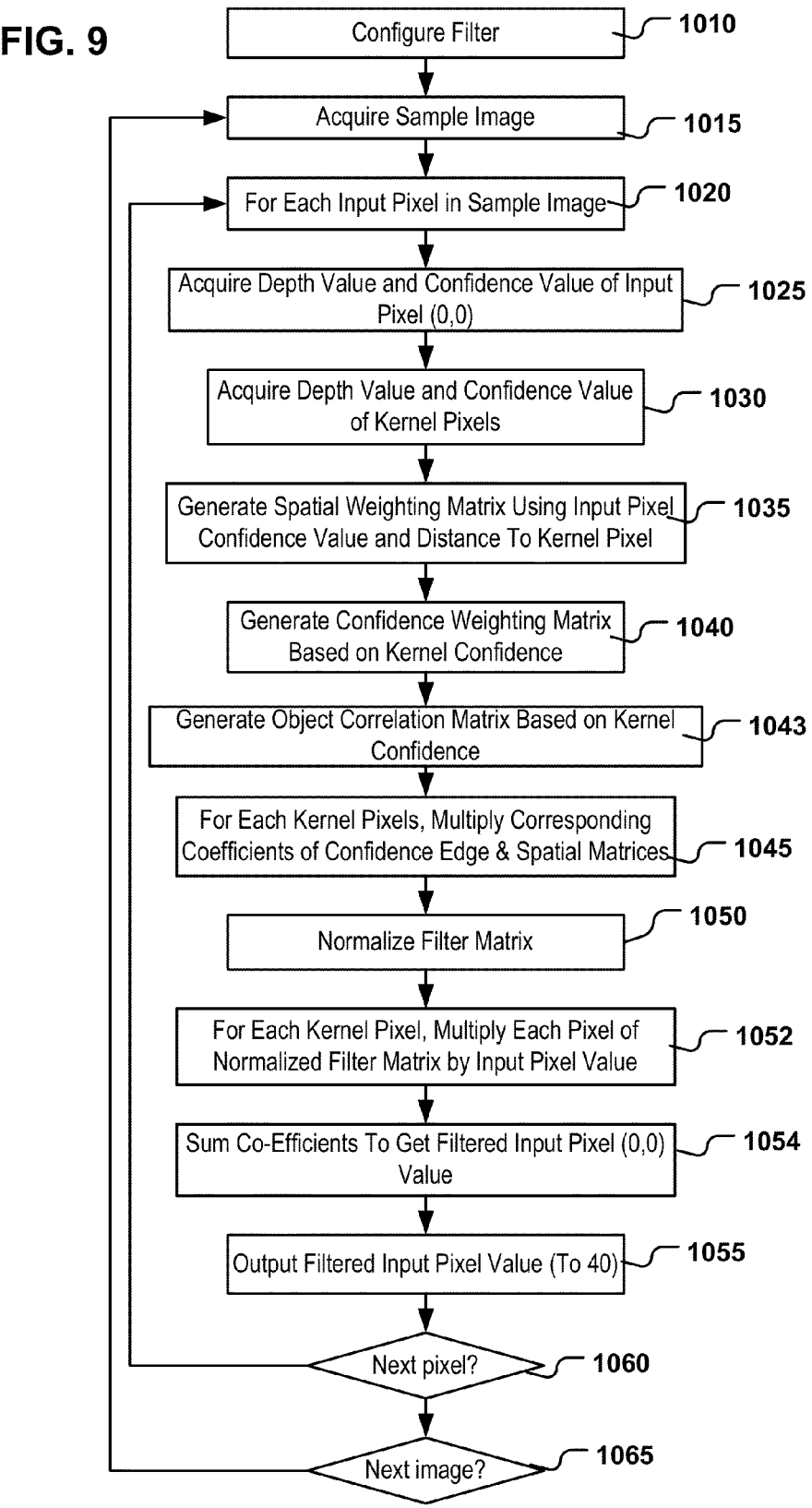
FIG. 9 illustrates a method for calculating a confidence weight normalized filter for each pixel in an image at 930.

FIG. 9 illustrates a method for calculating a confidence weight normalized filter for each pixel in an image at 930. In one embodiment, the method of FIG. 9 is performed by components 80, 82, 84, 85, and 86 in FIG. 1. Initially, at 1010, the filter is configured. To configure the filter, a spatial filter of kernels is selected. For example, spatial filter may be a 3×3 matrix or a 5×5 matrix of pixels, with the input pixel being the center pixel in the matrix, as illustrated in FIG. 5 at 475. As illustrated above, at FIG. 5, an input pixel 475 will be surrounded by 24 kernel pixels. Any size matrix may be utilized but for purposes of the foregoing description, a 5×5 spatial filter will be described. As discussed below, an algorithm constrained to work with a 5×5 spatial filter kernel gathers samples from the 24 pixels surrounding a central input pixel, providing 25 depth values and 25 confidence values in all.

At 1015, a sample image is acquired. Typically, images are sampled as frames of information, in a raster scan fashion. Hence, as described below, steps 1020 through 1055 are performed on a moving window on a pixel-by-pixel basis. At 1020, the steps 1025-1055 are performed for each input pixel in a sample image. At 1025 depth and confidence value of the input pixel are acquired. At 1030, the depth and confidence value of those pixels defined in the spatial kernel are acquired. At 1035, a spatial weighting matrix is generated using the input pixel confidence value and the distance to each kernel pixel. A method for performing the spatial weighting matrix as illustrated below with respect to FIGS. 12A and 12B. Generally, the spatial weighting matrix assigns a weighting to the input filter based on the contributions of kernel pixels, taking into account the pixel separation of the kernel pixels from the input pixel. Where a higher confidence is received for the input pixel (generally meaning a lower noise value for the pixel), then a narrower spatial filter is generated, thereby preserving spatial resolution. In addition, objects tend to have correlated depth and immediately adjacent pixels tend to be closer in value than pixels that are farther away. A higher confidence input pixel is assigned a higher weight in whatever spatial filtering methodology is utilized. Assignment of a filtered weight may occur using any number of filtering functions. In one example, a Gaussian function is utilized wherein the weight attributed to the pixel is:

$$e^{(-(distance*\sigma)^2)}$$

where sigma is assigned based on the confidence of the input sample. A value for sigma may be derived by reference to a lookup table providing for a narrower or wider filter based on the input pixel confidence value. Examples of a spatial weighting matrix are shown in FIGS. 12C and 12D.

In this manner, the filter may be adaptive—that is, the choice made for the filtering function and the weight assigned based on the input pixel can vary according to a choice made by a filter designer, or in accordance with the particular needs of the application for which the data is destined.

Figures 13A, 13B:
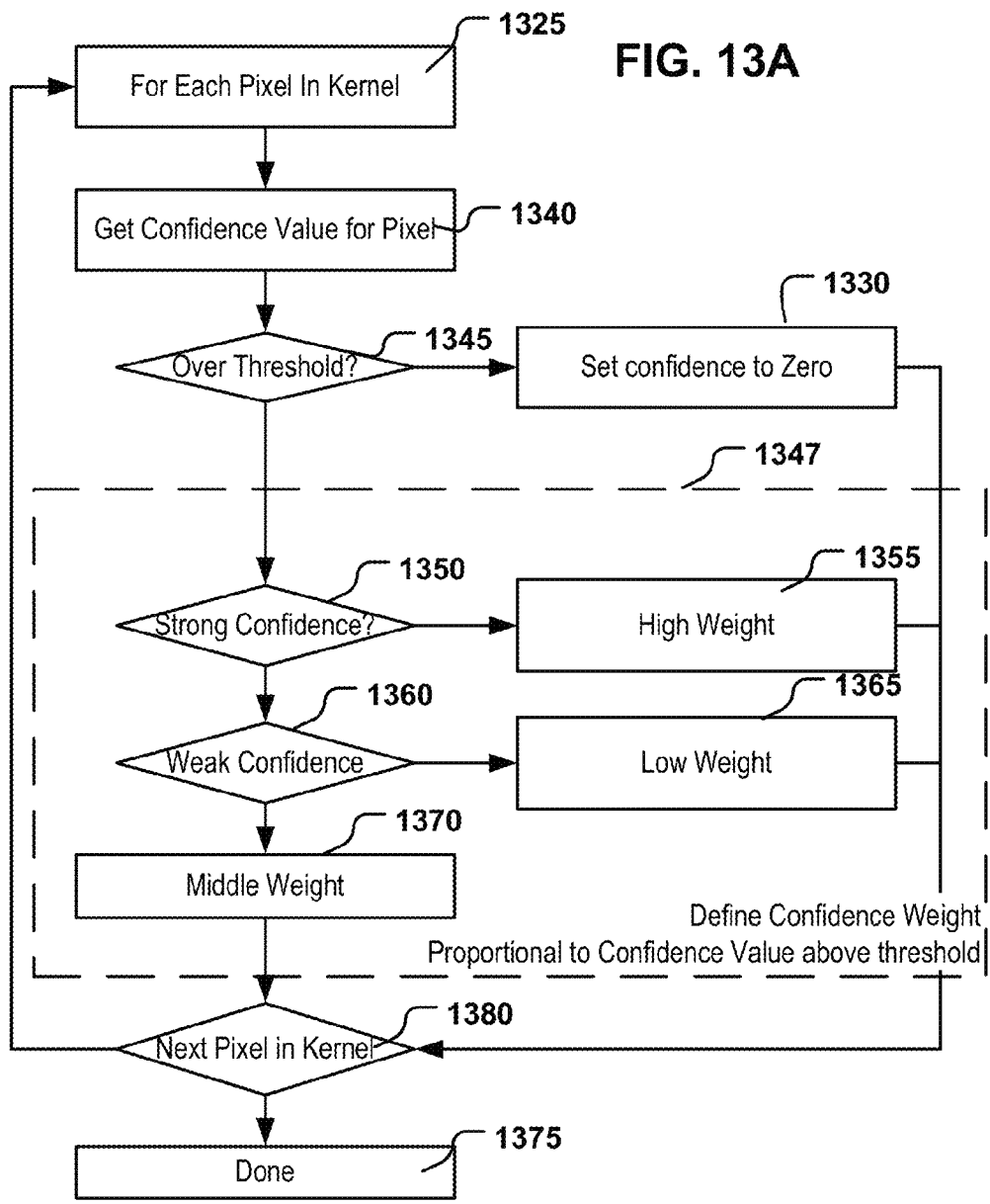
FIG. 13A illustrates a method in accordance with step 1040 described above for generating a confidence weighting matrix based upon individual kernel confidence FIG. 13B. illustrates confidence matrix for a given set of input pixels.

At 1040, a confidence weighting matrix based on the individual kernel confidence is generated. In 1040, the confidence of each source sample in the matrix kernel is utilized to generate a confidence weighting matrix. A method for creating a confidence weighting matrix is illustrated below in FIG. 13A. The confidence weighting matrix created at 1040 factors in the confidence one has that the pixels adjacent the input pixels have good distance data. An example of a confidence matrix is shown in FIG. 13B.

Figures 14, 15:
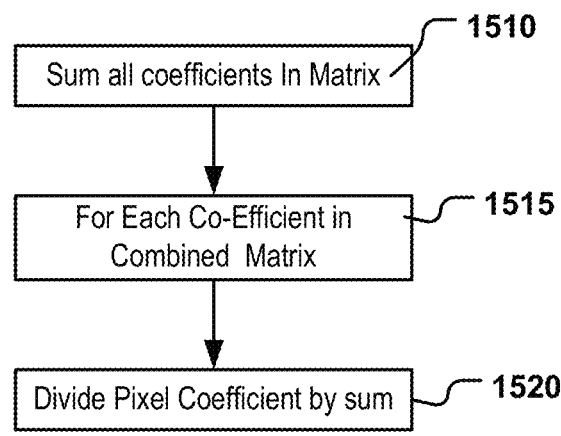
FIG. 14 illustrates a combined matrix.
FIG. 15 illustrates a process for normalizing the combined weighting matrix.

At 1043, an object correlation matrix is generated. Exemplary methods for creating an object correlation matrix are shown in FIG. 16. The object correlation matrix is used to avoid including pixels outside the image boundary (since they may be undefined) and pixels from different objects (since the distances are likely to not be correlated to each other) during the filtering process. In one alternative embodiment, object correlation is ignored and the object correlation matrix could be filled with values of 1 for each kernel tap. For an object correlation matrix where, for example, pixels at (−1,−1), (−2,−2), (−2,−1), etc are outside the boundary of the source image (i.e. undefined), the object correlation matrix can address this by zeroing out entries for pixel positions that fall outside the boundaries of the image. The confidence weighting matrix, the object correlation matrix and the spatial weighting matrix are combined at 1045. At 1045, each of the corresponding coefficients of confidence weighting matrix and the spatial weighting matrix are multiplied to provide a combined weighting matrix that is of the same order as the filter kernel size. An example of a combined matrix is shown in FIG. 14.

At step 1050, in order to preserve gain, each coefficient of the matrix is then divided by the sum of all coefficients to normalize the sample. At 1052, each pixel in the normalized combined matrix is multiplied by the input value of the pixel at that location in the kernel, and at 1054 the resulting products are summed to provide a filtered value for a given input pixel (0,0). At 1055, the filtered pixel value for the input pixel (0,0) is output to an application as noted at step 850 (FIG. 8), and at 1060 the method repeats for each pixel (shifting to the next pixel in an image (e.g. pixel (0,1) as indicated at 440 in FIG. 5), and at 1065 for each image in a sample.

FIG. 10 illustrates a method performed at step 1010 for configuring a filter. At 1110, the matrix size of the filter is selected. As noted above, the matrix size can be a 3×3 filter, 5×5 filter, 7×7 filter, and so on. At 1120, the distance from an input or central sample pixel and adjacent pixels is calculated. These distances are stored in a data store at 1130. An exemplary data store illustrating the distance values is shown in FIG. 11. In FIG. 11 table 1150 illustrates the exemplary distances to a center pixel 0,0. Using the Pythagorean theorem, the distance from each central pixel to an adjacent pixel is simply the square root of the x distance squared plus the square root of the y distance squared. Using table 1150, the closer a pixel is to a target, the more contribution a pixel will have to the target pixel 0,0. The matrix 1150 is used to assign weights based on the distance from a kernel pixel to the input pixel. As noted above, table 1150 may be stored in an input table, and given that many values are duplicative (only five unique values exist in table 1150) the table requires minimal space to store. It should be recognized that the distances stored in table 1150 are relative, rather than actual, values.

FIGS. 12A through 12D illustrate the creation of a spatial weighting matrix (at step 1035) using the input pixel confidence value and the distance to a kernel pixel noted above. In one embodiment, the creation of a spatial filter may be performed by the spatial weighting matrix generator 80. In one embodiment, at 1210, the confidence value for an input pixel (0,0) is acquired. At step 1215, lookup between the confidence value and a predefined weight for a given range of confidence values may be performed against a data store which has been pre-populated with weight assignments for confidence value ranges based on a given filtering function. Alternatively, based on the distance and confidence values, a selected function may be calculated to create coefficients to populate a spatial weighting matrix for pixel (0,0) At 1220, a filter is generated based on the weights assigned by the table factoring in the relative distance. In one embodiment, the relative distance may be factored in by dividing a weighting value by the distance value given in table 1150.

In the depth and confidence acquisition steps, noted above, samples may be acquired which are below a particular depth or confidence threshold. For samples indexed outside of the image, at an edge, or below the confidence threshold, depth and confidence values of zeros can be assigned. In this embodiment, a depth of zero is undefined (invalid). Assigning a value of zero to such values reserves a value to ignore pixels that are not contributing to a particular sample. Alternatively, one could assign a confidence of value of 0 to such pixels to invalidate their contribution to the filtered pixel output.

In some cases, an input pixel may be at an edge of a particular image. In other cases, edge pixels may defined as the boundary between objects at different depths (which may be considered as foreground objects and background objects). Such uncorrelated pixels may be treated, as discussed below, using the object correlation matrix.

Figure 12B:
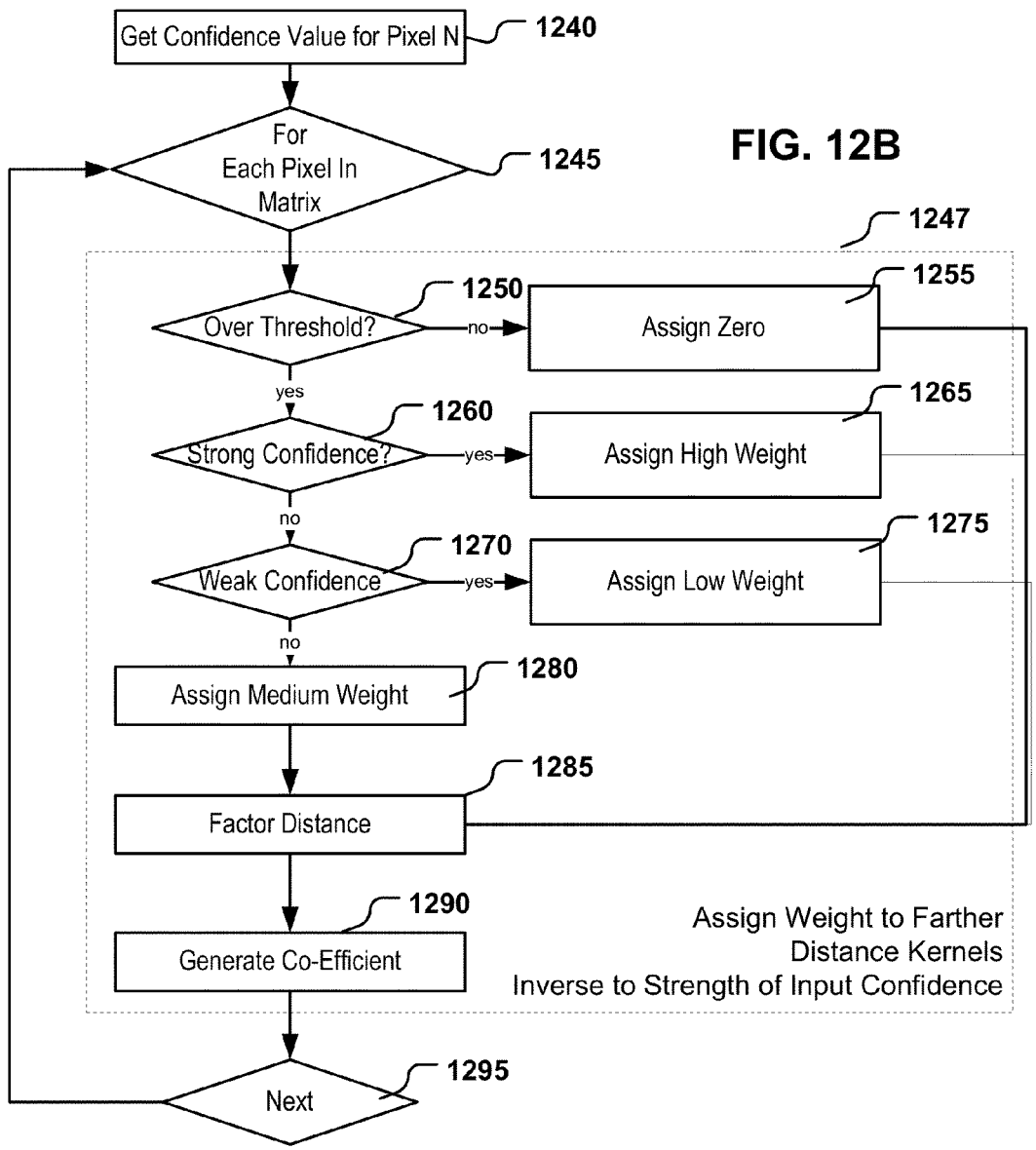

FIG. 12B illustrates a method for creating a spatial weighting matrix using input pixel confidence value and distance to a kernel pixel. Initially, at 1240, the confidence value for a given input pixel is acquired. At 1245 for each pixel in the matrix, a series of steps 1247 is performed to create an assigned weight to farther distance pixels which is generally inverse of the strength of the input confidence. Initially, at 1255, a determination is made as to whether or not the confidence value is over a particular threshold. If not, a zero value may be assigned at 1260. If at 1265 a strong confidence value of the input pixel is found, then a strong weighting for a given filtering technique is assigned at 1270. If a weak confidence is found at 1275, then a weak filtering weight is assigned at 1275. If a balanced confidence is found at 780, then a balanced weight is assigned. It should be understood that any number of thresholds and corresponding weights may be assigned, resulting in additional steps and additional thresholds in addition to steps 1250, 1260 and 1270. As noted above, one method to generate a spatial weighting matrix is to assign a weight value within a particular filtering function used. It should be further recognized that steps 1255 through 1280 may be performed by reference to a lookup table having confidence ranges that correspond to filter weight assignments.

Once the value weight is determined, the distance of a particular pixel in the matrix is incorporated at 1285 and the coefficient generated at 1290 to populate the spatial matrix. Two examples of a narrow spatial matrix in a wide spatial matrix, respectively, are illustrated in FIGS. 12C and 12D. As illustrated in FIG. 12C at 1296, the Input pixels 0,0 has a weight factor of 0.7 while edge pixels −2,2 have a weight of 0.05. In the wider spatial matrix at 1297, these values change to 0.5 and 0.15, respectively. Examination of the respective values in FIGS. 12C and 12D illustrate that the weights attributed to pixels other than the input sample 0,0 are greater in the matrix 1296 versus that of 1275. Each of the coefficients in each of the matrices is utilized in successive steps to generate the ultimate filtered weighted matrix.

FIG. 13A illustrates a method in accordance with step 1040 described above for generating a confidence weighting matrix based upon individual kernel confidence. In one embodiment, the confidence weighting matrix is created by the confidence weighting matrix generator 82. At step 1325, for each pixel in a kernel matrix, the confidence value of the individual pixel is retrieved at 1340. If the value is not over a base threshold at 1345, then the confidence value is set to zero at 1330. If the confidence weight is over an initial threshold at 1345, then a series of steps 1347 is performed to define a confidence weight in the matrix which is generally proportional to the confidence value of the kernel pixel. If a strong confidence is found at 1330, then a high weight is assigned at 1335. If a weak confidence is found at 1340, then a low weight is assigned at 1345. Otherwise, a middle weight may be assigned at 1350. It should be noted that the thresholds defining strong, weak and middle confidences are arbitrarily shown in FIG. 13A, and any number of different thresholds may be utilized. Steps defined by bounding box 1347 may be performed by reference to a predefined set of values and particular weights assigned to the confidence value in a lookup table which is performed by the hardware FIG. 1.

A confidence matrix for a given set of input pixels is illustrated in FIG. 13B. In one embodiment, the confidence values may be 8-bit numbers ranging from zero to 255, and the confidence matrix 1390 illustrated in FIG. 13B illustrates a series of values attributed to different pixels in the array.

FIG. 14 illustrates a combined matrix which is provided by step 1045 and retrieved by multiplying the confidence matrix, such as confidence matrix 1390 by the spatial weighting matrix (such as matrices 1295 or 1297). As shown therein, a coefficient for each pixel in the kernel results. Multiplier 85 may create the combined matrix.

FIG. 15 illustrates a process for normalizing the combined weighting matrix. In one embodiment, the weight matrix normalizer 84 may created a normalized matrix. At step 1510, the sum of all coefficients in the matrix is calculated by adding all the coefficients illustrated in FIG. 14 together. At 1515, for each coefficient in the combined matrix, the matrix value is divided by the sum of all coefficients in the matrix at 1520. The result is a normalized sample as discussed above with respect to step 1050.

As noted above at 840, the normalized filter is combined with the input data by collator 86. At 86, each kernel in the normalized matrix is multiplied with a corresponding kernel input value, and the resulting products summed to provide a filtered value for the input pixel, as described above.

FIG. 16 illustrates a process for generating an object correlation matrix where some of the source (kernel) pixels are outside the boundary of the image. For each pixel in a kernel (1605), at step 1610, a determination is made as to whether or not a particular pixel is outside the image boundary. If outside, then at 1620, the object correlation matrix value for that pixel is assigned to zero.

If not, then at step 1625, a determination is made as to whether or not a particular pixel is in the same depth plane as the center pixel in the kernel. Known foreground/background pixels can be determined by a variety of ways, such as by looking for pixel gradients (slew rates) above a specified threshold. If pixel from a depth plane that is different than the center pixel is found, then at 1660, then the object correlation matrix value for that position is assigned zero, otherwise it is assigned a 1 at 1665. The method repeats at 1635 until the last pixel in the kernel. At step 1670, the method may return to step 1045 in FIG. 9 to continue processing the pixel.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

I claim:

1. A method for filtering depth information the depth information including a confidence measure; comprising:
   receiving input data including depth information on a scene, the depth information comprising a plurality of pixels, each pixel including a depth value and a confidence value;
   generating a spatial weighting matrix based on the confidence value of the input pixel, generating a confidence weight normalized filter for each pixel in the depth information, the confidence weight normalized filter based on the spatial weighting matrix including a filtering weight derived from pixel confidence values relative to a distance of pixels surrounding each said pixel and a confidence weighting matrix;
   combining the confidence weight normalized filter and the input data; and
   outputting filtered data to an application.

2. The method of claim 1 wherein generating a confidence weight normalized filter includes:
   selecting an input pixel in the depth information;
   generating the spatial weighting matrix assigning a first filter weight based on contributions of a kernel of pixels surrounding the input pixel, taking into account the distance of the kernel pixels from the input pixel;
   generating the confidence weighting matrix based on the confidence value of each pixel in the kernel;
   multiplying the confidence weighting matrix and the spatial weighting matrix to provide a combined matrix;
   normalizing the combined matrix; and
   multiplying the combined matrix with the input data; and summing the combined matrix products to derive a final filtered value.

3. The method of claim 1 further including generating an object correlation matrix and multiplying the combined matrix by the object correlation matrix.

4. The method of claim 1 wherein the step of generating the spatial weighting matrix includes calculating a distance from the input pixel to every pixel in the spatial matrix and combining the distance with the confidence value of the input pixel.

5. The method of claim 4 wherein the step of generating the spatial matrix includes assigning a greater weight to the input pixel depth value than weights assigned to kernel pixel depth values when the input pixel confidence value is higher than a specified threshold.

6. The method of claim 4 wherein the step of generating the spatial matrix includes assigning a greater weight to kernel pixel depth values than a weight assigned to the input pixel depth values when the input pixel confidence value is lower than a specified threshold.

7. A method for filtering depth information the depth information including a confidence measure; comprising:
   receiving depth information on a scene, the depth information including a depth value and a confidence value;
   selecting an input pixel in the information;
   generating a spatial weighting matrix assigning a first filter weight based on confidence value contributions from a kernel of pixels surrounding the input pixel, the confidence value contribution relative to a distance of each kernel pixel from the input pixel;
   generating a confidence weighting matrix based on the confidence value of each pixel kernel;
   generating an object correlation matrix based on the relative depth between an input pixel and pixels in the kernel;
   combining the confidence weighting matrix, object correlation matrix, and the spatial weighting matrix to provide a combined matrix;
   normalizing the combined matrix; and
   multiplying the combined matrix with the input data and summing the products to derive a final filtered value.

8. The method of claim 7 wherein the step of generating the object correlation matrix includes determining whether a kernel pixel is undefined or on a different depth plane than the input pixel, and if so, assigning a value of zero to the kernel pixel, otherwise assigning a value of one to the kernel pixel.

9. The method of claim 7 wherein the step of generating the spatial weighting matrix includes generating the spatial weighting matrix based on a confidence value of the input pixel.

10. The method of claim 9 wherein the step of generating the spatial matrix includes calculating a distance from the input pixel to every pixel in the kernel of pixels and combining the distance with the confidence value of the input pixel.

11. The method of claim 10 wherein the step of generating the confidence weighting matrix includes assigning a weighting value based on the confidence value of each pixel in the kernel.

12. The method of claim 9 wherein the step of generating the spatial matrix includes assigning a greater weight to the input pixel depth value than weights assigned to kernel pixel depth values when the input pixel confidence value is higher than a specified threshold.

13. The method of claim 12 wherein the step of generating the spatial matrix includes assigning a greater weight to kernel pixel depth values than a weight assigned to the input pixel depth values when the input pixel confidence value is lower than a specified threshold.

14. An apparatus, comprising:
   a depth information input;
   a spatial weighting matrix generator;
   a depth confidence weighting matrix generator;
   a first multiplier coupled to the spatial weighting matrix generator and the depth confidence weighting matrix generator and outputting a combined matrix;
   a combined matrix normalizer coupled to the first multiplier, wherein the first multiplier provides the combined matrix by summing coefficients of each of the input pixel and kernel pixels in the confidence weighting matrix and the spatial weighting matrix; and
   a second multiplier coupled to the depth information input and the combined matrix normalizer, the multiplier providing a filtered depth information output.

15. The apparatus of claim 14 wherein the spatial weighting matrix generator includes an output comprising a first filter weight generated based on a kernel of pixels surrounding an input pixel, taking into account the distance of each kernel pixels from the input pixel.

16. The apparatus of claim 15 wherein the depth confidence weighting matrix generator outputs a confidence weighting matrix based on the confidence value of each pixel kernel.

17. The apparatus of claim 14 wherein the second multiplier combines depth information from the input with a normalized combined matrix.

18. The apparatus of claim 17 wherein spatial weighting matrix generator outputs a spatial weighting matrix based on a confidence value of the input pixel.

\* \* \* \* \*